Jan. 9, 1934.   W. A. MARTIN   1,942,969
COTTON PICKER
Filed July 18, 1932   2 Sheets-Sheet 2
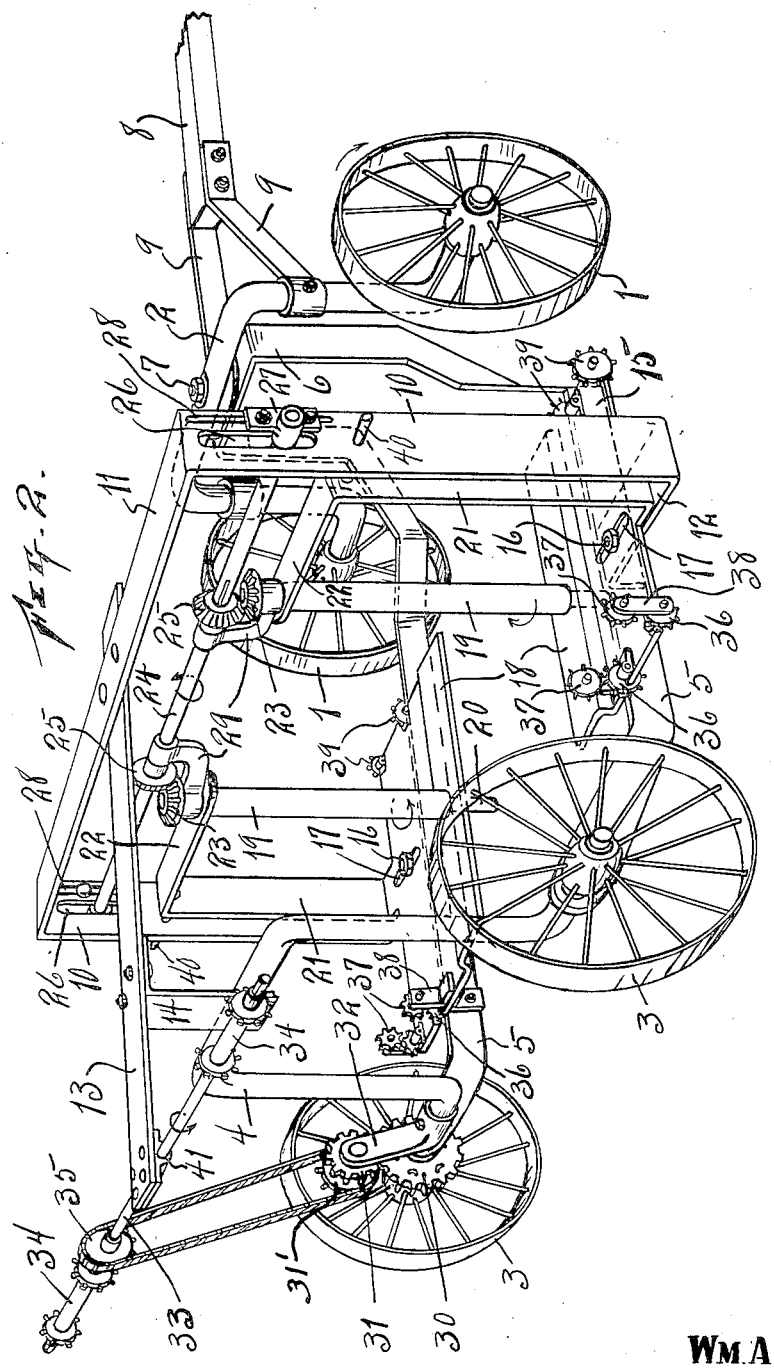
INVENTOR
WM. A. MARTIN.
BY
ATTORNEY Patented Jan. 9, 1934

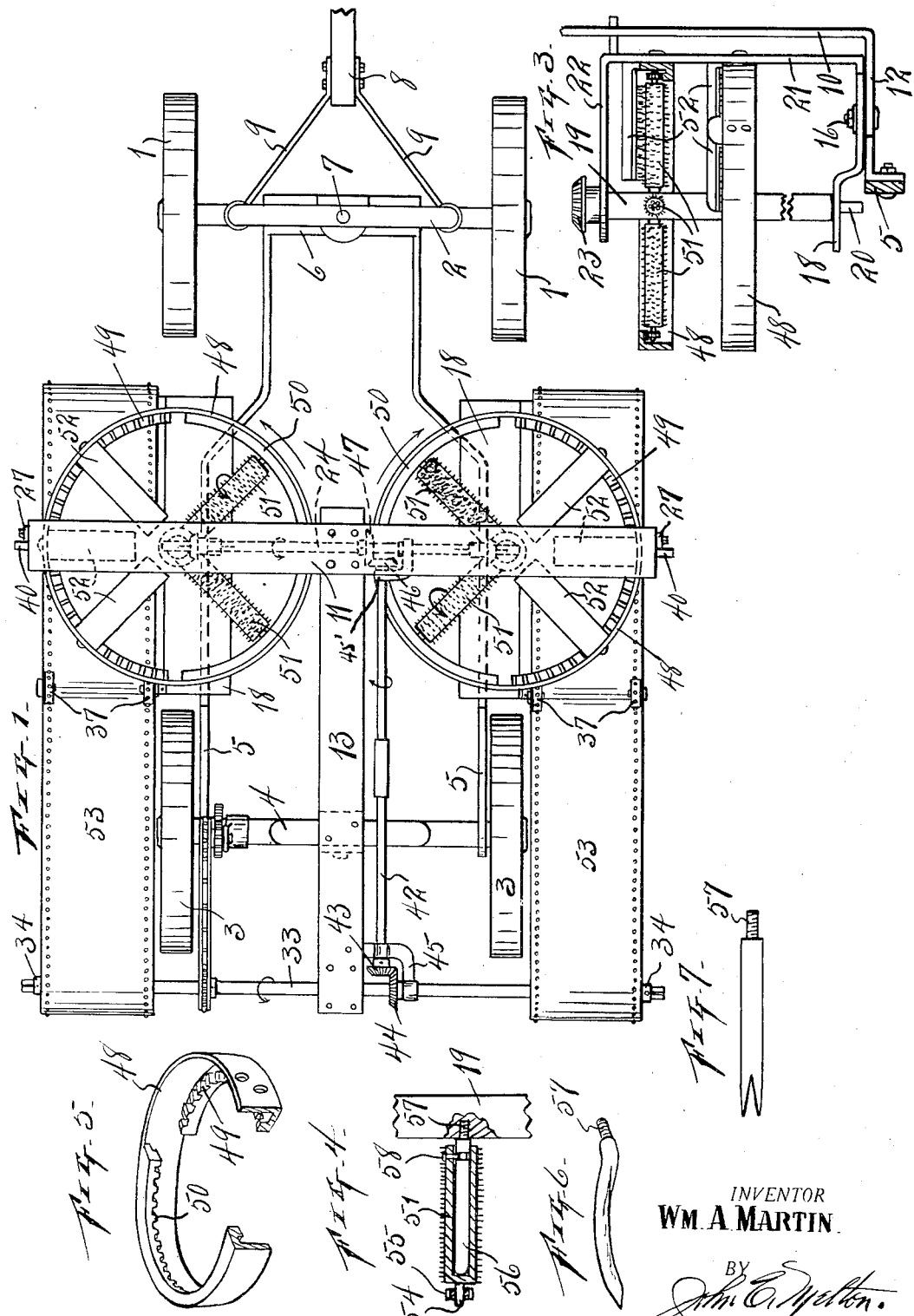

1,942,969

UNITED STATES PATENT OFFICE 1,942,969

COTTON PICKER

William A. Martin, Fort Worth, Tex., assignor of one-half to H. E. Vaughan, Dallas, Tex.

Application July 18, 1932. Serial No. 623,198

3 Claims. (Cl. 56—44)

My invention relates to cotton picking machines and more particularly to a machine which is adapted to remove the lint from the vine without injury to the immature bolls; and the object is to provide a machine for this purpose which is inexpensive to make and positive in operation. Another object is to construct a cotton picker which may be converted into a boll puller or stalk cutter.

An advantage of this invention is that any and all adjustments of the machine may be made without removing the machine from the field and without the attention of an expert operator. Another advantage of this device is that provision is made for conveying the cotton lint to the rear of the machine where it may be sacked or otherwise disposed of.

Other objects and advantages will be fully explained in the following description and the invention will be more particularly pointed out in the claims.

Reference is had to the accompanying drawings which form a part of this application.

Fig. 1 is a plan view of the machine.

Fig. 2 is a perspective view of the frame of the machine and a part of the working parts.

Fig. 3 is a detail view of one of the lint removing units.

Fig. 4 is a vertical section of one of the picker spindles of the units.

Fig. 5 is a perspective view of part of the gearing used to rotate each of the spindles as they are turned on their axles.

Fig. 6 is a perspective view of a knife which may be carried by the spindle axles for cutting the cotton stalks.

Fig. 7 is a side elevation of a boll pulling unit adapted to be carried by the spindle axles.

Similar characters of reference are used to indicate the same parts throughout the several views.

The machine consists of a chassis having forward tractor wheels 1 provided with a U shaped axle 2, and rear tractor wheels 3 provided with a similar axle 4. The frame of the machine consists of side members 5, the rear ends of which are suspended from the axle 4, and an inverted U shaped front end 6 which is pivotally connected to the center of the axle 2 by means of a bolt 7. The form of the axles 2 and 4 and the frame 5 permits the wheels of the machine to straddle a cotton row without bending the vine. A tongue 8 is made rigid with the front axle 2 of the machine by means of link bars 9 rigidly attached to the tongue and to the axle 2 of the chassis.

The chassis frame is provided with a cross member which consists of side members 10 and a top 11. The lower ends 12 of the sides 10 are bent towards each other so that they may be made rigid with the sides 5 of the frame. This structure is strengthened by a brace 13 which is made rigid with the center of the top 11 and extended longitudinally with the machine and connected to the center of the rear axle 4 by means of a bracket 14. The cross member which consists of sides 10 and a top 11 forms an upright yoke made rigid with the frame of the machine and adapted to carry the individual cotton picking units in such a manner as to permit them to engage the cotton plant from each side of the row.

The two cotton picking units are each provided with a base plate 15 which are adjustably mounted on the sides 5 of the frame and the members 12 of the yoke by means of a bolt 16. The bolts 16 pass through a slot 17 in the base plates 15 and into the portions 12 of the yoke so that the base plates 15 may be slid towards or from each other and held rigid thereon at any predetermined position. The plates 15 are provided with an elevated portion 18 on their inner sides relative the chassis and the outer edges are turned up to form vertical side members 21. The members 21 are adapted to extend parallel with and adjacent to the sides 10 of the yoke. The upper ends of the sides 21 are turned towards each other to form arms 22. The arms 22 extend beneath and parallel with the top 11 of the yoke and serve as bearing brackets for the picker units.

The pair of picker units consists of upright rotating shafts or axles 19 which are journaled in the raised portions 18 of the base plates 15. The upper ends of the shafts or axles 19 are each journaled in the arms 22 and are each provided with a pinion 23 which is rigid with the axles 19 and positioned above the arms 22. The axles 19 are provided with spokes 56 made rigid therewith and positioned at various elevations on the axles. The ends of the spokes 56 are provided with threaded portions 57 which screw into the axles 19. Elongated picker spindles or cards 51 are rotatably mounted on each spoke 56 by means of a pin 58 which projects through the spindle 51 into a groove in each of the spokes 56. The outer ends of each of the spindles are provided with a projecting lug 54 which is adapted to carry a gear wheel 55 rigid therewith. The lower ends of the axles 19 are provided with projections 20 which extend through openings in the raised portion 18 of the plates 15. The ends 20 are a continuation of the axles 19 but of a smaller diameter than the body of the axles 19.

A drive shaft 24 is rotatably journaled in the sides 10 of the yoke and extended beneath and parallel with the top 11 of the yoke. The upper ends of the sides 10 are provided with slots 26 and the ends of the shaft 24 pass through the slots 26 and through bearings 27 which are adjustably positioned on the outer sides of the sides 10 of the yoke. Slots 28 are provided in the sides 10 and these slots are parallel with and adjacent to the slots 26 so that the bearings may be adjusted vertically in the sides 10. This adjustment permits the raising and lowering of the shaft 24. The shaft 24 is provided with pinions 25 keyed thereto and adapted to mesh with and drive the pinions 23 of the axles 19. These pinions are held in operative relation to each other by means of yoke bearings 29. The yoke bearings 29 consist of a bearing for the shaft 24 and a bearing for the axle 19 both yoked together and adapted to hold the pinions constantly in mesh.

The pair of picker units are adapted to be adjusted vertically and horizontally in the frame of the machine. The vertical adjustment of the units is attained by raising or lowering the shaft 24 in the slots 26 of the sides 10. The raising or lowering of the shaft 24 raises the axles and their cooperating parts by means of the yoked bearings 29. Horizontal movement of the pair of units is attained by releasing the bolts 16 and positioning the base plates 15 in a predetermined relation to each other. The horizontal adjustment of the units permit the units to be set at any distance from each other in accordance with the size of cotton vine to be picked. If the vines were small the units would be positioned close to each other so that there would be only a small space between the units for the passage of the row of cotton. The vertical adjustment is provided for various heights of the vine. The illustration Fig. 2 shows the lowest vertical adjustment of the axles 19. In this position the yoke bearing 29 of the axles 19 rest upon the arms 22. When the shaft 24 is raised the axles 19 will be raised and the ends 20 of the shaft will permit the axles 19 to be raised from their base 18 without removal from the base. A rod 40 is made rigid with each of the uprights 21 and projects through an opening in the sides 10 of the yoke so that the base 15 and uprights 21 will be kept in alinement with the machine during the horizontal adjustment of the units.

The picker units are adapted to remove the cotton lint from the vine with spindles 51 which have an action similar to a card. The picker spindles 51 are provided with wire or other suitable material which are formed in prongs and give a brush effect. The brush portion radiates from the outer periphery of the spindles 51 and engage the lint while they are rotating in one direction and are adapted to release the lint when they are turned in a reverse direction. The axles 19 cause the spindles to be revolved as spokes on a wheel while they are caused to be revolved on the spoke 56 of the axles 19. Provision is made for revolving the spindles 51 as they rotate with the axles 19. A series of bands 48 are adjustably mounted on the sides 21 of the base and these bands encircle the axles 19 and are of a sufficient inner diameter to inclose the spindles 51 and their gear wheels 55. A band is provided for each set of spokes 56 at various elevations on the axles 19. Each band 48 is provided with a segment of gearing 49 and 50. The gearing 49 is made rigid with the band 48 and positioned so as to engage with and drive the gear wheel 55 of the spindle 51 in one direction while the lint is being removed from the spindles 51 while the gear segment 50 is adapted to mesh with and drive the gear 55 in another direction as the spindle is engaging the cotton. The gear 50 is made rigid with the band 48 and is adapted to engage the gear 55 from the top and the gear segment 49 is adapted to mesh with the gear wheel 55 from the bottom thereof. The relation of the planes of the two segments 49 and 50, of each of the bands 48, permit the gear wheels 55 to engage one segment from the underside during one half of its turn about the axle 19 and engage the top of the other segment during the rest of its rotation around the axle 19. This structure permits the spindles to turn in one direction on the spokes while engaging the cotton vine and the other direction while contacting with a means for removing the lint from the spindle. This rotation of the spindles in opposite directions on the spokes 56 during each of their rotation around the axles 19 may be governed so that they turn in a given direction during one half of their axial rotation and the other direction during the second half of their axial rotation. When the units are adjusted vertically in the chassis of the machine the bands 48 are each adjusted vertically on the side members 21 so that the segments of gearing 49 and 50 will function to cause the spindles 51 to rotate on the spokes 56.

Means are provided for removing the lint from the spindles 51 which consists of a plurality of brushes 52 which are made rigid with the bands 48 adjacent the sides 21. The brushes are adapted to engage the brush portions of the spindles 51 during the rotation of the spindles 51 in the opposite direction from the direction of their rotation while engaging the cotton lint. The tops of the brushes 52 are preferably round so that the cotton lint may fall past the lower tiers of brushes 52 and spindles 51 to a conveyor belt 53 which passes over the base plates 15 and to the rear of the machine.

A conveyor belt 53 is adapted to pass over the lower portion of each of the base plates 15. The plates 15 are provided with sprocket wheels 39 journaled on the front ends thereof and adapted to permit the continuous conveyor belts 53 to travel thereabout and up to sprocket spools 34. The spools 34 are made rigid with a shaft 33 which is journaled to the frame member 13 by means of a bearing 41. The shaft 33 is positioned on the frame of the machine above and to the rear of the axle 4 and parallel with the axle 4. The belt 53 is made to travel parallel with and above the base plate 15 by means of sprocket wheels 36 journaled on the rear of the base plate 15 and idler sprockets 37 set in operative relation to the sprockets 36 so that the belt 53 will slope upward to the spools 34 in its travel from the base 15. The idlers 37 are journaled on the base 15 by means of a bracket 38 made rigid with the base and adapted to serve as a bearing for the idlers 37.

The shaft 33 is driven by sprocket and chain connection to one of the rear tractor wheels 3 of the machine. A gear 30 is made rigid with the tractor wheel 3 and adapted to mesh with and drive a gear 31 which is held in operative relation thereto by means of a bracket 32. The bracket 32 is made rigid with the rear axle 4 and adapted to serve as a bearing for the gear 31. A sprocket wheel 31' is rigid with the axle of the gear 31 and driven thereby. The shaft 33 is provided with a sprocket wheel 35 rigid therewith and driven by the sprocket 31' by means of a sprocket chain connection.

The shaft 24 is driven by the shaft 33. A shaft 42 is suspended in the frame of the machine and adapted to span the distance between the shafts 24 and 33. A gear pinion 43 is made rigid with one end of the shaft 42 and is adapted to mesh with and be driven by a pinion 44 which is made rigid with the shaft 33. The other end of the shaft 42 is provided with a pinion 46 rigid therewith and adapted to mesh with and drive a pinion 47 which is keyed to the shaft 24. Each pair of pinions 43, 44, and 46, 47 are held in operative relation to each other by a means similar to the method of holding the pinions 23 and 25 in relation. The pinions 43 and 44 are held by means of a yoke bearing 45 and the pinions 46 and 47 are held in operative relation by means of a yoke bearing 45'. The shaft 42 is made in two telescopic units to conform with the position of the shaft 24.

What I claim, is:

1. In a cotton picking machine having a frame provided with tractor wheels and axles therefor; a picker unit carried on each side of said frame and adapted to engage the cotton plant from each side of the row thereof, said picker unit consisting of a vertical shaft provided with spokes radiating therefrom, means for adjusting said units vertically and horizontally relative to said frame, cylindrical cards rotatably mounted on said spokes and adapted to engage the cotton plant and remove the lint therefrom, means for removing the lint from said cards, means for revolving said shaft and the spokes thereof, and means for rotating said cards on said spokes.

2. In a cotton picking machine having a frame provided with tractor wheels and axles therefor; a pair of picker units carried by said frame and adapted to engage the cotton plant from each side of the row thereof, said units consisting of shafts journaled in said frame and provided with spokes radiating therefrom, means for varying the distance between said shafts, picker spindles rotatably mounted on said spokes and adapted to engage and remove the lint from said cotton, means carried by said frame for engaging said spindles and removing the lint therefrom, means for revolving said shafts, means for rotating said spindles in one direction during their engagement with the cotton plant, and means for rotating said spindles in the opposite direction during their engagement with the lint removing means.

3. In a cotton picking machine having a frame provided with tractor wheels and axles therefor; adjustable rotable picker spindles journaled in said frame and adapted to engage the cotton plant and remove the lint therefrom, brushes carried by said frame and adapted to engage said spindles and remove the lint therefrom, means for horizontally adjusting said spindles, means for rotating said spindles as a unit, means for revolving said spindles in one direction during their engagement with the cotton plant, and means for revolving said spindles in the other direction during their engagement with said brushes.

WILLIAM A. MARTIN.